G. W. FERDON.
ADJUSTABLE FOOD CARRIER.
APPLICATION FILED SEPT. 24, 1919.
1,362,933.
Patented Dec. 21, 1920.
2 SHEETS—SHEET 1.
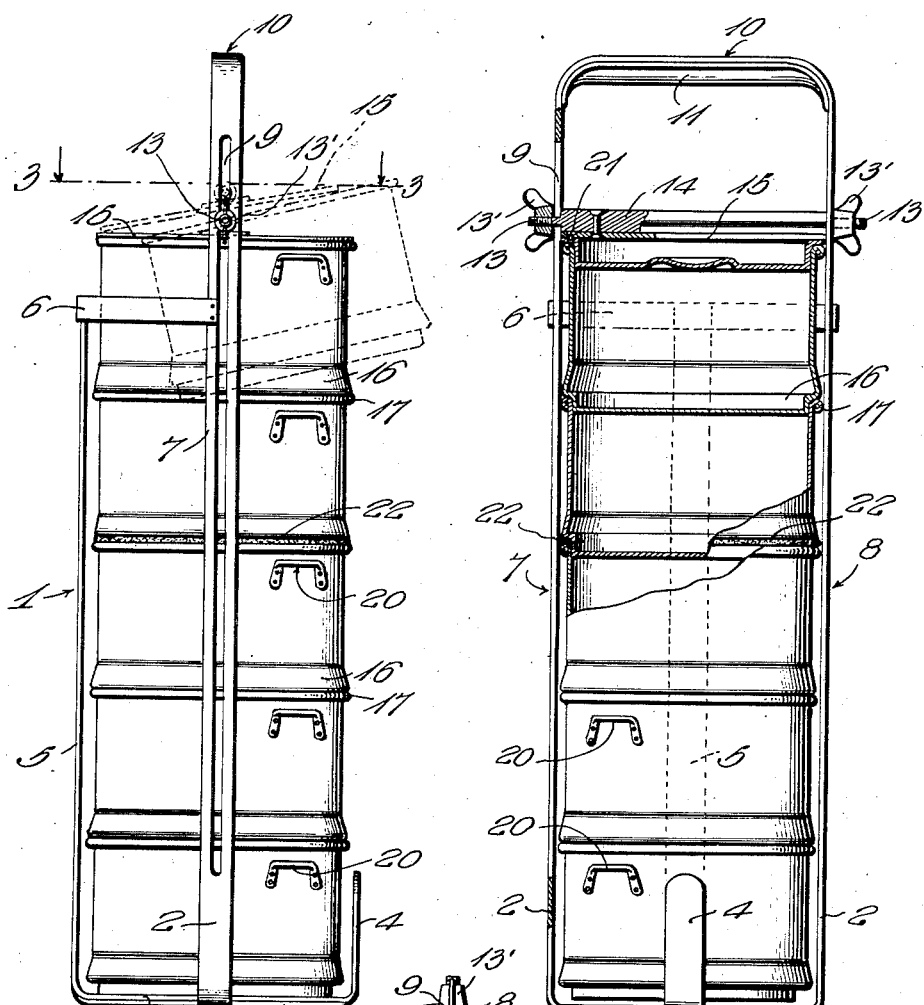
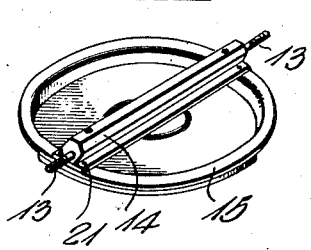
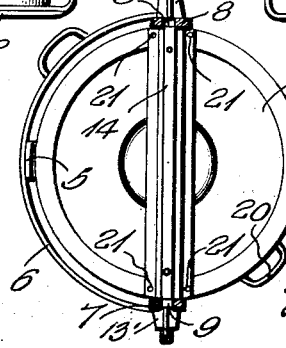
Inventor
Guy W. Ferdon
by
Attorney

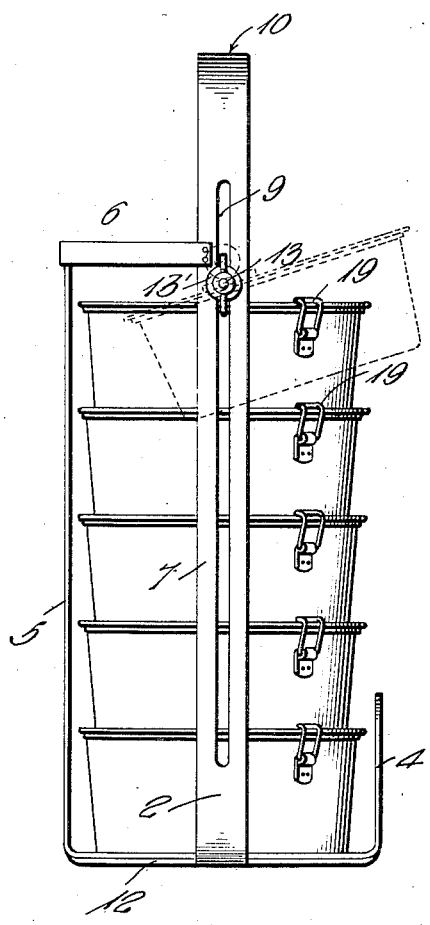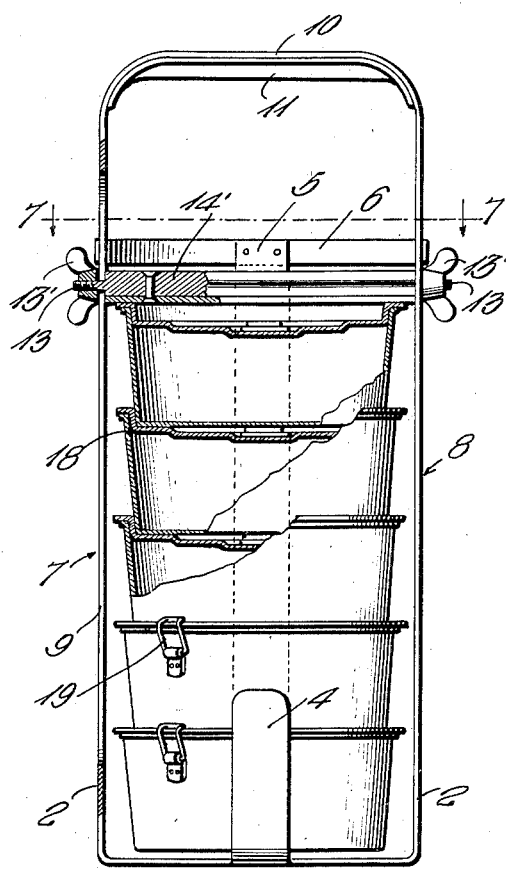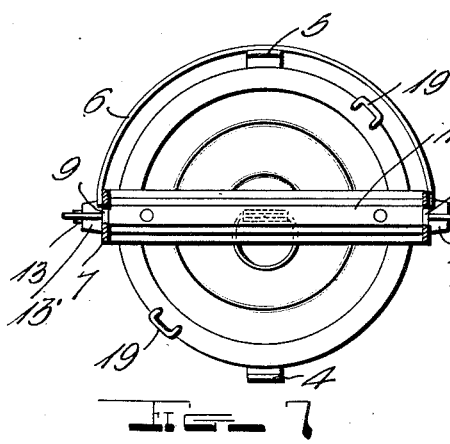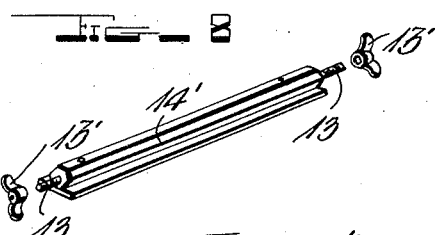

UNITED STATES PATENT OFFICE.

GUY W. FERDON, OF CRESSKILL, NEW JERSEY.

ADJUSTABLE FOOD-CARRIER.

1,362,933.  Specification of Letters Patent.  Patented Dec. 21, 1920.

Application filed September 24, 1919. Serial No. 326,074.

*To all whom it may concern:*

Be it known that I, GUY W. FERDON, a citizen of the United States, residing at Cresskill, in the county of Bergen, State of New Jersey, have invented certain new and useful Improvements in Adjustable Food-Carriers; and I do hereby declare the following to be a full, clear, and exact description of the invention, such as will enable others skilled in the art to which it appertains to make and use the same.

My invention relates to a device for carrying a series of containers, nested and stacked, said device being provided with means whereby each of the containers may be removed in turn from the top of the stack and the one next to follow be automatically covered up and held in place in the support or rack.

My device may be used for:—

(A) Carrying food from place to place in either a hot or cold condition, either liquid or solid.

(B) Carrying grain or the like for feeding purposes to stock, poultry, etc., a kettle or container being left at different places.

(C) Carrying different ingredients later to be mixed at another place. That is these ingredients are selected and weighed in one place and put or mixed together at another by mixing the contents of the cans at the latter place. This is particularly useful in the case of rapid setting cements.

In the drawing:

Figure 1 is a side view of one form of my device, and Fig. 2 a front view partly in section.

Fig. 3 is a top view looking downward on the line 3—3, and Fig. 4 is a view of my weighted cap or cover.

Fig. 5 is a view of a modification looked at from the side.

Fig. 6 is a view of the same modification partly broken away, looked at from the front.

Fig. 7 is a top view on the line 7—7; and

Fig. 8 is a view of the weight or follower detached or removed from the lid.

In the drawing I provide a rack 1 made of two strips of metal 2, 3, across each other as shown, and provided with arms extending upward. These arms for the piece 3 are numbered 4, 5, and it will be noted that one of these arms extends up but a short distance, that is, less than the height of a single container, while the other extends up to the top, or nearly the top of a stack of the containers where it is united to an arcuate piece 6. The part 2 is bent at right angles and extends up into arms 7 and 8 united at their upper part to the piece 6, and in each is provided a slot 9; the arms of this piece are extended upward and made to form a handle 10. They may be united at the handle or elsewhere, as by rivets at the bottom. 11 is a filling piece fitting into the handle; 12 is another filling piece fitted in below to give the frame or support a level standing means. The same effect may be obtained in other ways, as by offsetting the upper piece.

Fitted to slide in the slots 9 by means of the extensions 13 is a weight 14 which is in Fig. 4 shown secured to a lid 15 adapted to fit and cover any one of the containers. This lid, with the attached weight or rod constitutes a follower which, when the thumb nuts 13' adapted to screw on extensions 13 are loosened, permits the lid to follow down as the topmost receptacles in succession are removed, and automatically cover the next one below. At the same time by means of the thumb nuts 13' referred to, I may secure this weight and lid at any point desirable. I may secure it above the stack of receptacles or I may clamp it down firmly upon the stack.

Each of the receptacles in Figs. 1 and 2 is provided with a shouldered bottom 16 adapted to fit into the next receptacle below it and support itself by the flange 17, thus sealing the contents of the lower receptacle against access of air and loss of heat, and almost entirely against sloppage or leakage of liquids, while at the same time it is adapted to be covered by the lid.

It will thus be seen that the stack of vessels thus constructed is held against tipping off the carrier. The bottom vessel cannot escape past the arm 4. The top vessel is held by the lid and the projections 14 in the slot so that it too cannot get away, and the whole stack is kept firmly in place. This is accentuated if the nuts 13' are screwed home, after the cover has been pressed down firmly upon the topmost vessel of the stack; usually, however, in carrying the rack and vessels from place to place the weight of the top or cover is sufficient to hold the receptacles in place.

Each receptacle or vessel in turn can be removed by the operator, who simply gives the topmost one a slightly upward movement to free it from the one below, and then an outward movement to free it from the cover; the weight or weighted top then drops down into place and closes the next one. The operator thus has his hands free for the work in hand. He can carry the rack with one hand and simply and expeditiously remove the vessels with the other, one by one. At the same time the cans or pots or vessels are always kept closed, unless the operator chooses to hold or fasten the weighted cover or weighted follower above the stack of cans.

In Figs. 5 and 6 I show a slight modification in that I provide each vessel with a cover, and the bottom of each vessel is adapted to fit into the cover of the one below it, as clearly indicated at 18. I also provide clamps 19, each adapted to hold a cover in place, and instead of the weighted lid I use merely the weight 14' provided with thumb nuts 13', and this weight acts as a follower and follows down the slots 9 as each vessel in turn is removed and comes to rest upon the top of the vessel next below, thus insuring the firm retention of the stack in place.

I may provide necessary handles 20 for the larger sized vessels, and I show a rivet 21 by means of which I may fasten the weight to the top, Fig. 3. I also show the arm 4 in Fig. 5 extending higher than the same arm in Fig. 1, and the operation is obviously the same.

It is obvious that various changes and modifications may be made within the scope of my invention, and I reserve the right to all equivalents of the various features and elements of my invention as detailed above and as stated in the claims.

In using my device, say in starting to deliver food on the rolling deck of a vessel, or in any other like unsteady place, I start with the entire rack, say of six vessels, more or less. I reach man A or men A and B whom I want to pass food to, I release the nuts 13' or other fastening means on each side, and then taking hold of the uppermost vessel I remove it by pulling slightly upward and then outward. This gives me the first mess or feeding. When removing this vessel, the cover above it slides down immediately and automatically by its own weight or gravity, and reaching the new position covers the next vessel; I can then fasten it or not as I please and go on to the next stop, repeating the operation until all of the vessels are disposed of. I have one hand free to carry the rack and the other free to remove each food vessel.

In case the vessels have each its own cover, I use the same rack, only I do not fasten my cross rod or weight to the upper cover. This cross rod or weight 14' drops by gravity as each vessel is removed. I carry my slots upward in each instance far enough to allow for the upward movement of the cover or of the bar alone without the cover, even when all the vessels are in place and filled. This permits the easy removal of the topmost vessel. I effect this by slightly slanting the cover or weighted rod as indicated by the dotted lines in Fig. 2.

It is obvious that my device may be used in a variety of relations and for numerous purposes. It may be used in delivering broth, gruel, or other food or liquid to the various wards of a hospital indoors, to summer cottages about a central kitchen, to tents near a central camp, to Boy Scouts or Camp Fire Girls near the central cooking tent, to soldiers when at rest *en route* or on march, from a rolling army kitchen, to apartments in a hotel, to class rooms in a day school, and wherever or whenever food may be carried within a reasonable time from the place where the food or other contents is to be placed in the vessel to the place where it is to be consumed.

As indicated above, however, my device is not intended to be limited for the distribution of food, although it is preëminently adapted for that purpose. It may be carried safely and securely anywhere because it clamps and secures the various containers safely together. If I desire to heat insulate it I simply make a bag of suitable insulating cloth or provide a receptacle of suitable material for the purpose.

Attention is called to the fact that it may be hung up or suspended by the handle in any proper relation.

It may also be used for the distribution of a meal consisting of various dishes differing in temperature, for instance a meal consisting of hot soup and hot meat with a cold salad and a cold dessert. This I accomplish by using two covers, both of them sliding in the slot; that is, I place in the bottom of the rack two vessels, say, one containing a cold salad, the other containing a cold dessert, with or without ice in them. I then place a cover on the top vessel of these two, and above this cover I may place an asbestos or other heat insulating pad 22, and on this pad and above it, I place the vessels containing the heated components of the meal. I may use this pad without the intermediate cover. The hot vessels are thus kept separated from the cold vessels for an indefinite period, or at least for a time sufficient to permit the easy distribution and consumption of a meal.

It will thus be seen that I have devised and invented a structure well adapted to carry food containing vessels for prompt and easy distribution wherever they may be needed. The vessels are not, of course, limited to carry food.

Having thus described my invention what I claim as new and desire to secure by Letters Patent of the United States is:

1. In an adjustable food carrier, for a series of containers adapted to form a stack, in combination, a support for said series of food containers permitting their individual sidewise removal, diametrically opposite vertical guiding means on said support, and a follower, guided by said guiding means adapted to rest upon and hold shut the topmost of a stack of containers, and, as each successive topmost one of the stack is removed, to follow down and hold shut the topmost one left.

2. In an adjustable food carrier, for a series of nesting containers adapted to form a stack, in combination, a support for said stack open on one side to permit sidewise removal of said containers, there being a vertical slot in said support, a weighted follower, adapted to be guided in said slot to hold shut the topmost one of a stack of containers by its weight, and means connected with the slot and follower, whereby the follower may be held adjusted at varying heights.

3. In an adjustable food carrier, for a series of nesting containers adapted to form a stack, in combination, a support for said containers open on one side to permit sidewise removal on one side only, guiding means on said support arranged on opposite sides and extending beyond the height of the stack, a weighted follower adapted to any of the containers, and devices on said follower coöperating with said guiding means, said stack and support being arranged to permit the removal of members of the stack, the follower being adapted to hold shut each topmost container in succession, and thereby hold shut all the containers of the series.

4. In an adjustable food carrier, in combination, a series of nesting food containers, a support for the series, said support being arranged to allow access all around to the containers, but open for the removal of vessels only on one side, a pair of diametrically opposite vertical slots in said support, a weighted follower having extensions adapted to enter said slots adapted to hold shut each topmost container of a stack as the individual vessels of the stack are removed, and clamping means on said extensions adapted to hold the follower at any desired height.

5. In an adjustable food carrier, in combination, a series of round interchangeable containers adapted to be stacked one upon the other and provided with means whereby they may be nested, a support for said stack, said support consisting of two bars crossing each other at the bottom and bent upward to form side braces, one of said side braces being continued upward to an extent not greater than the height of a container, whereby above the first container the support is left open for the ready removal of any top container, a lid adapted to fit any topmost container, said lid being weighted to fall by gravity, and means for guiding said weight so that as each topmost container is removed, the weight will be guided and the cover held by its weight on the container next below.

6. In a food carrier, in combination, a series of nesting round containers adapted to form a stack, a support for said stack having arms extending up from the bottom at two sides and the back, the side arms being continued upward and bent over to form a handle, the rear arm being continued to the height of a complete stack, a semicircular brace connecting the top of the rear arm and the two side arms, vertical slots in said side arms, a weight and a lid, the lid adapted to close any one of the series, and the weight adapted to hold the lid on, said weight being provided with extensions traversing said slots, and nuts on said extensions whereby the weight may be held at one height or allowed to follow down the stack as the containers are one by one removed.

7. In a food servitor, in combination, a series of containers adapted to form a stack, a frame in which they may be arranged for transportation and for sidewise removal *seriatim*, said containers being interchangeable before stacking, guiding means on opposite sides of said frame, means whereby the frame holds the containers from removal except forward or upward, and a weighted covering means guided on said frame for covering the topmost one of said containers, while they are in the stack.

8. A rack for carrying a series of stacked and nested food containers, said rack having arms extending upward on three sides to the height of the stack, means connecting said arms near the top of the stack, one of said arms at least being provided with guiding means, and a weighted cover, adapted to rest upon and keep shut the topmost one of the stack, whatever the height of the stack and to be guided by said guiding means, to covering position.

In testimony whereof I affix my signature.

GUY W. FERDON.